Patented Nov. 3, 1925.

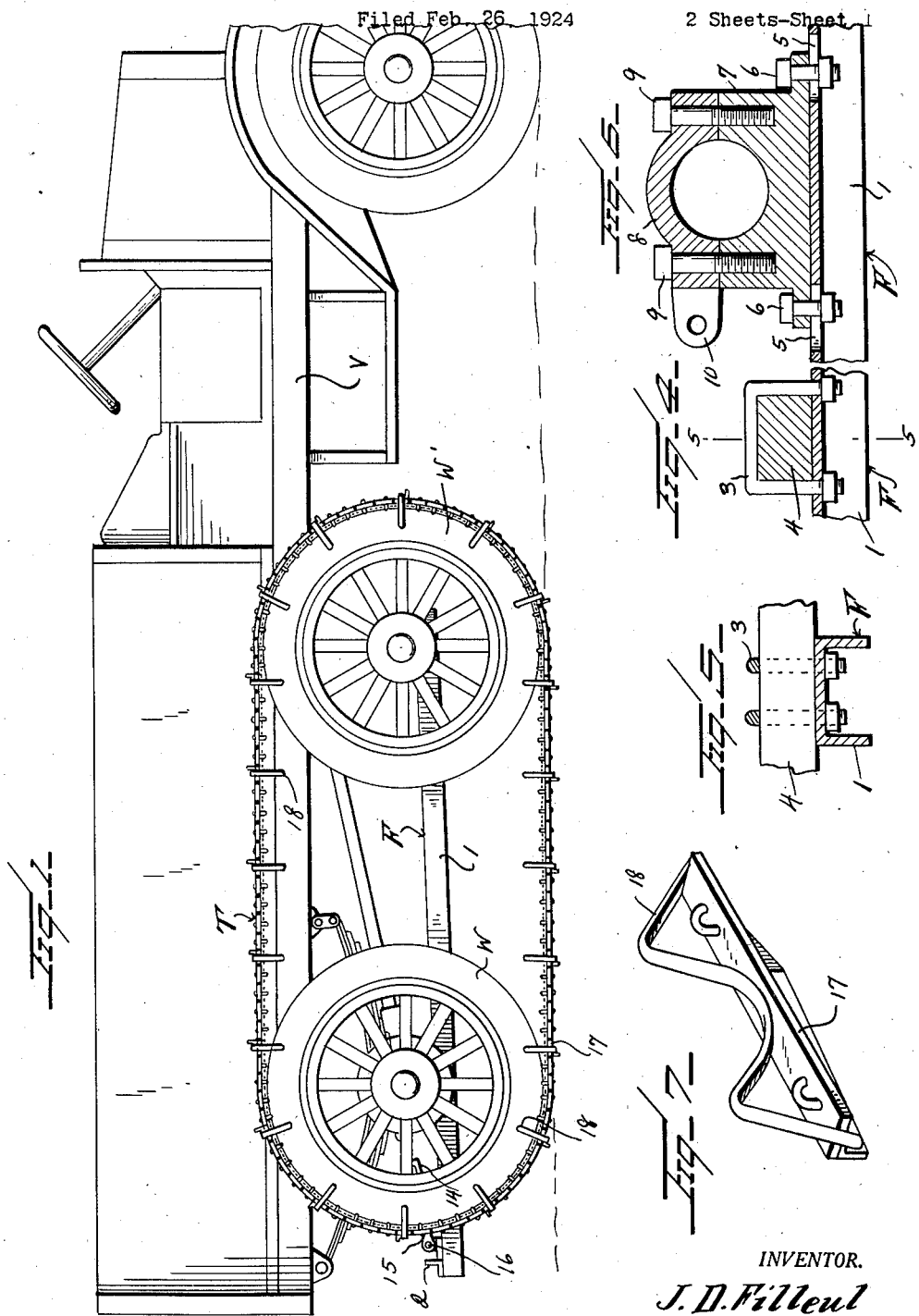

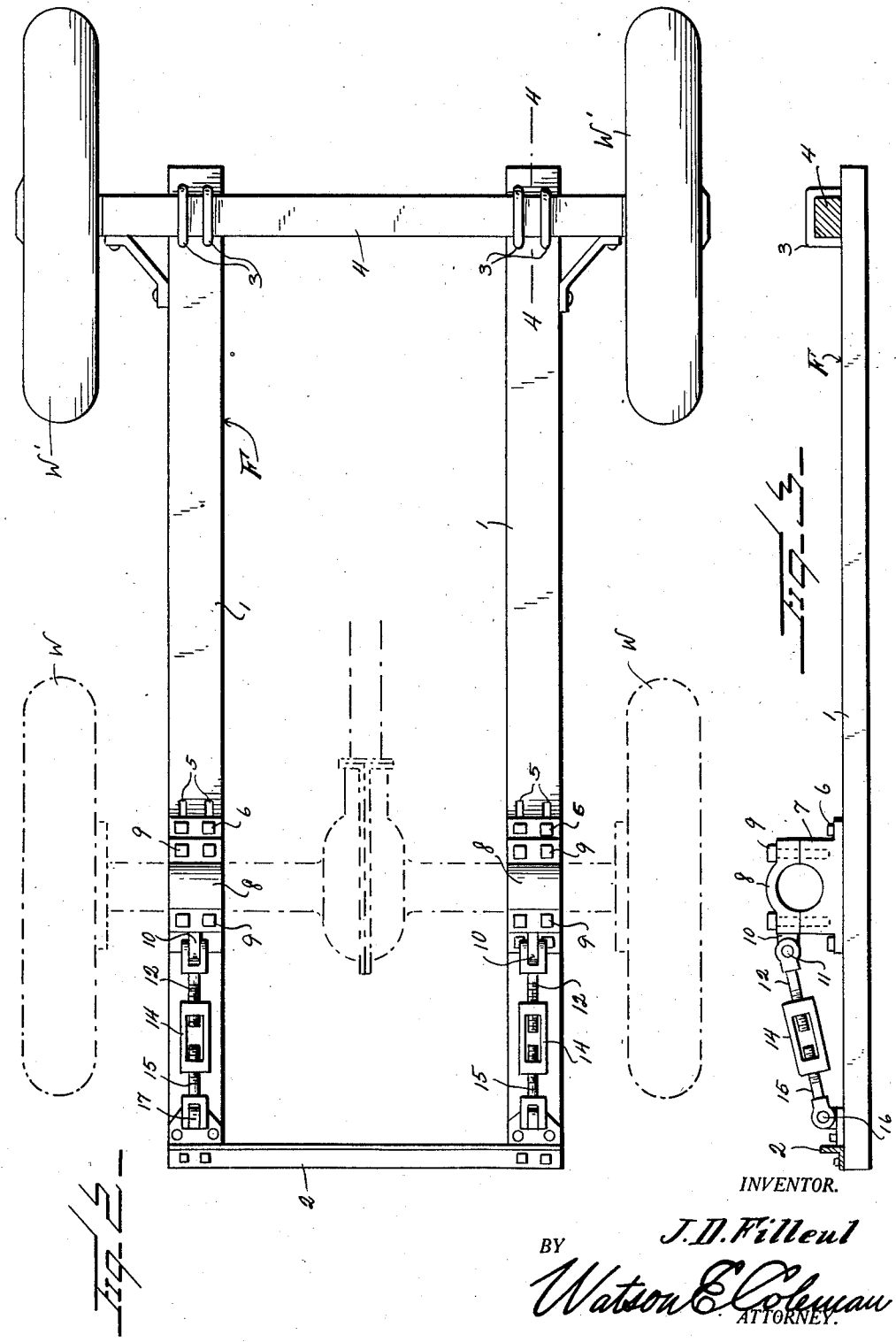

1,560,224

UNITED STATES PATENT OFFICE.

JAMES DOUGLASS FILLEUL, OF MANCHESTER, NEW HAMPSHIRE.

TRACTION DEVICE.

Application filed February 26, 1924. Serial No. 695,352.

To all whom it may concern:

Be it known that I, JAMES DOUGLASS FILLEUL, a citizen of the United States, residing at Manchester, in the county of Hillsborough and State of New Hampshire, have invented certain new and useful Improvements in Traction Devices, of which the following is a specification, reference being had to the accompanying drawings.

This invention relates to certain improvements in traction devices for vehicles and it is an object of the invention to provide a novel and improved device of this general character which, when in applied or working position, serves effectually to permit the vehicle to travel over snow, ice and the like.

Another object of the invention is to provide a novel and improved device of this general character which may be readily applied into working position without requiring any substantial change in or readjustment of the structure of the vehicle proper.

Another object of the invention is to provide a novel and improved device of this general character comprising a frame structure adapted to be freely engaged with the rear axle or housing of a vehicle and which frame is also provided with wheels, the rear or driving wheels of the vehicle and the wheels of the frame having operatively engaged therewith an endless tread.

The invention consists in the details of construction and in the combination and arrangement of the several parts of my improved traction device for vehicles whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in side elevation illustrating a traction device constructed in accordance with an embodiment of my invention and in applied position;

Figure 2 is a view in top plan of my improved device as herein disclosed, the rear axle or housing of a vehicle and its concomitant parts being diagrammatically indicated by broken lines;

Figure 3 is a longitudinal sectional view taken centrally through the device as illustrated in Figure 1;

Figure 4 is a sectional view taken substantially on the line 4—4 of Figure 2;

Figure 5 is a fragmentary view partly in section and partly in elevation, the line of section being substantially on the line 5—5 of Figure 4;

Figure 6 is an enlarged fragmentary view partly in section and partly in elevation illustrating in detail one of the adjustable bearings adapted for engagement with the rear axle or housing;

Figure 7 is a view in perspective of a guide comprised in the endless tread.

As disclosed in the accompanying drawings, V denotes a motor driven vehicle of a conventional type and which includes the rear axle housing and the drive wheels W associated therewith in a conventional manner.

My improved device embodies a frame F comprising the elongated side members 1 of desired dimensions which are connected at their rear end portions by the cross member 2 herein disclosed as an angle bar secured to said side members from above. The forward end portions of the members 1 are clamped, as at 3, or otherwise fixedly secured to the transversely disposed axle 4 extending beyond the side members 1 and on which extended portions are mounted the wheels W', said wheels being herein disclosed as of a conventional type employed in connection with motor driven vehicles.

The rear end portion of each of the members 1 is provided with a pair of longitudinally disposed slots 5 spaced apart in a direction lengthwise of the member 1 and through which are disposed the holding bolts 6 associated with a bearing 7. Associated with the bearing 7 is a bearing cap 8 held to the bearing 7 in a well-known manner by the bolts 9. Projecting rearwardly from the cap 8 is a lug 10 with which is pivotally connected, as at 11, an end portion of a shank 12. Operatively engaged with the shank 12 is a turn-buckle 14 which is also operatively engaged with the shank 15, said shank 15 being pivotally connected, as at 16, with an upstanding bracket 17 carried by an adjacent side member 1 at a point in close proximity to the rear cross member 2. The opposed end portions of the shanks 12 and 15 are oppositely threaded so that upon requisite rotation of the turn-buckle 14 the bearing 7 may be moved forwardly or rearwardly as may be required and in order to impose requisite tension upon the endless tread member T. The member T is particularly described and illustrated in a separate application for Patent Serial No. 695,353, filed February 26, 1924, and therefore a detailed explanation, in the present instance, is believed unnecessary except to note that certain of the cross members 17 comprised therein are provided with the guides 18 coacting with the tires of the wheels W and W' when the device is in applied position to maintain said tread T in working position and to assure the requisite frictional drive of each of said tread members through the instrumentality of a wheel W.

In applying my improved device, each of the bearings 7 and its associated cap 8 is operatively engaged with the rear axle or housing in a manner whereby the frame F is free to be raised or lowered in a vertical direction. In applying the frame F the wheels W' are forwardly disposed and are in longitudinal alignment with the wheels W. With my improved attachment in applied position the vehicle may be readily driven over snow or ice and also driven with equal facility over an uneven surface, the swinging mounting of the frame F permitting requisite raising and lowering of the wheels W' to compensate with any inequalities or obstructions with which each of the treads T may come in contact.

While I herein disclose my improved attachment as engaged with a rear axle housing it is to be understood that there may be conditions wherein the tread may be operatively engaged with the axle proper or other transversely disposed member and therefore in hereinafter claiming my invention it is to be understood that by referring to rear axle is included any equivalent structure.

From the foregoing description it is thought to be obvious that a traction device for vehicles constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. The combination with a traction vehicle including a rear housing and drive wheels associated therewith; of a frame, elongated side members, a cross member connecting the rear end portions of the side members, a transversely disposed axle connecting the forward end portions of said side members, means for pivotally connecting the rear end portions of the side members to the housing whereby the axle of the frame is positioned forwardly of the housing, wheels mounted on the axle and in line with the driving wheels, and endless tread members operatively engaged with the drive wheels and with the wheels of the frame.

2. The combination with a traction vehicle including a rear housing and drive wheels associated therewith; of a frame, elongated side members, a cross member connecting the rear end portions of the side members, a transversely disposed axle connecting the forward end portions of said side members, upstanding bearings mounted upon the rear end portions of the side members, coacting means carried by said bearings and side members to permit the bearings to be adjusted lengthwise of the side members, bearing caps engageable with the bearings, said bearings and bearing caps pivotally connecting the rear portions of the side members with the housing, means coacting with the bearing caps and the portions of the side members rearwardly of the bearings to adjust said bearings lengthwise of the side members, wheels mounted upon the axle and aligning with the drive wheels, and endless tread members disposed around the drive wheels and the wheels on the axle.

3. The combination with a traction vehicle including a rear housing and drive wheels associated therewith; of a frame, elongated side members, a cross member connecting the rear end portions of the side members, a transversely disposed axle connecting the forward end portions of said side members, upstanding bearings mounted upon the rear end portions of the side members, coacting means carried by said bearings and slide members to permit the bearings to be adjusted lengthwise of the side members, bearing caps engageable with the bearings, said bearings and bearing caps pivotally connecting the rear portions of the side members with the housing, lugs carried by the bearing caps, shanks pivotally connected with said lugs, additional shanks pivotally connected with the side members rearwardly of the bearings, turn-buckles coacting with said shanks and operating to adjust the bearings along the side members, wheels mounted on the axle, and endless tread members operatively engaged with the drive wheels and with the wheels of the frame.

In testimony whereof I hereunto affix my signature.

JAMES DOUGLASS FILLEUL.